US008256192B2

(12) United States Patent
Cerf

(10) Patent No.: US 8,256,192 B2
(45) Date of Patent: Sep. 4, 2012

(54) FILM WRAPPING GABLE CONTAINERS

(76) Inventor: Alain Cerf, Reading Beach, FL (US)

( * ) Notice: Subject to any disclaimer, the term of this patent is extended or adjusted under 35 U.S.C. 154(b) by 469 days.

(21) Appl. No.: 12/591,887

(22) Filed: Dec. 3, 2009

(65) Prior Publication Data

US 2011/0132800 A1    Jun. 9, 2011

(51) Int. Cl.
*B65B 13/20* (2006.01)
*B65B 35/40* (2006.01)
*B65B 35/58* (2006.01)
*B65B 13/32* (2006.01)

(52) U.S. Cl. ............ 53/442; 53/446; 53/448; 53/531; 53/142; 53/143

(58) Field of Classification Search ........... 53/531, 53/142, 143, 537–539, 247, 249–252, 235, 53/442, 446, 448, 461, 463; 383/59; 24/399, 24/30.5 R; 198/411
See application file for complete search history.

(56) References Cited

U.S. PATENT DOCUMENTS

| 2,069,926 | A | * | 2/1937 | Read | 53/438 |
| 3,043,070 | A | * | 7/1962 | Cammack | 53/544 |
| 3,435,584 | A | * | 4/1969 | Prechter | 53/500 |
| 3,576,094 | A | * | 4/1971 | Savageau et al. | 53/493 |
| 3,594,977 | A | * | 7/1971 | Grasvoll | 53/535 |
| 3,604,181 | A | * | 9/1971 | Adcox | 53/495 |
| 3,717,239 | A | * | 2/1973 | Carter | 198/374 |
| 3,777,445 | A | * | 12/1973 | Anderson | 53/397 |
| 3,802,154 | A | * | 4/1974 | Dillon | 53/154 |
| 3,859,772 | A | * | 1/1975 | Thierion | 53/443 |
| 3,901,166 | A | * | 8/1975 | Morandi et al. | 198/411 |
| 3,914,921 | A | * | 10/1975 | Doran et al. | 53/543 |
| 3,984,964 | A | * | 10/1976 | Stoll | 53/543 |
| 3,986,319 | A | * | 10/1976 | Puskarz et al. | 53/447 |
| 3,987,604 | A | * | 10/1976 | MaGill | 53/113 |
| 4,555,892 | A | * | 12/1985 | Dijkman | 53/142 |
| 4,768,642 | A | * | 9/1988 | Hunter | 198/419.2 |
| 4,771,589 | A | * | 9/1988 | Mueller et al. | 53/446 |
| 4,776,148 | A | * | 10/1988 | Mingozzi | 53/143 |
| 4,843,797 | A | * | 7/1989 | Butterly et al. | 53/448 |
| 4,901,502 | A | * | 2/1990 | Colamussi | 53/143 |
| 5,027,585 | A | * | 7/1991 | Russell | 53/458 |
| 5,150,563 | A | * | 9/1992 | Hartness | 53/539 |
| 5,185,984 | A | * | 2/1993 | Tisma | 53/252 |
| 5,537,803 | A | * | 7/1996 | Olsen | 53/467 |
| 5,560,184 | A | * | 10/1996 | Tisma | 53/531 |
| 5,669,200 | A | * | 9/1997 | Disrud | 53/201 |
| 5,697,202 | A | * | 12/1997 | Totilo | 53/475 |
| 5,701,726 | A | * | 12/1997 | Smith | 53/544 |

(Continued)

FOREIGN PATENT DOCUMENTS

JP    2006096384    * 4/2006

*Primary Examiner* — Hemant M Desai
*Assistant Examiner* — Gloria R Weeks
(74) *Attorney, Agent, or Firm* — Sam Silverberg

(57) ABSTRACT

This invention is directed to film wrapped and heat shrunk bundles of gabled containers to form bundles that can be stacked on pallets and not be constrained by the gables in determining the size of the bundles. This is accomplished by nesting the gable containers on a conveyor on their side. The nesting of the gable containers on their side provides a stable structure that can be moved on a conveyor to be film wrapped. After film wrapping, the containers are conveyed to a heat shrink tunnel to form bundles of gable containers that can be placed on a pallet.

18 Claims, 4 Drawing Sheets

U.S. PATENT DOCUMENTS

| | | | |
|---|---|---|---|
| 5,787,680 A * | 8/1998 | Tisma et al. | 53/244 |
| 5,896,728 A * | 4/1999 | Domino et al. | 53/458 |
| 5,927,053 A * | 7/1999 | Donovan et al. | 53/543 |
| 6,164,045 A * | 12/2000 | Focke et al. | 53/543 |
| 6,290,393 B1 * | 9/2001 | Tomic | 383/210.1 |
| 6,499,583 B1 * | 12/2002 | Sohlberg | 198/374 |
| 6,651,297 B1 * | 11/2003 | Borchardt | 24/399 |
| 6,684,611 B2 * | 2/2004 | Cassoli | 53/537 |
| 6,711,877 B2 * | 3/2004 | Zschoche | 53/250 |
| 6,834,755 B2 * | 12/2004 | Jay | 198/418.6 |
| 6,868,651 B1 * | 3/2005 | Sorensen | 53/247 |
| 6,883,210 B1 * | 4/2005 | Savicki | 24/30.5 R |
| 6,928,702 B1 * | 8/2005 | Savicki et al. | 24/30.5 R |
| 6,996,879 B1 * | 2/2006 | Savicki | 24/30.5 R |
| 7,159,375 B2 * | 1/2007 | Hellmann et al. | 53/445 |
| 7,162,779 B2 * | 1/2007 | MacHacek | 24/399 |
| 7,316,052 B2 * | 1/2008 | Pawloski et al. | 24/585.12 |
| 7,395,643 B2 * | 7/2008 | Franchini et al. | 53/436 |

* cited by examiner

FILM WRAPPING GABLE CONTAINERS

FIELD OF THE INVENTION

This invention relates to film wrapping gable containers such as milk and juice cartons. After film wrapping the containers are heat shrunk to form a bundle that can be stacked on a pallet.

BACKGROUND OF THE INVENTION

In the prior art, the packaging of gable containers such as milk and juice cartons comprises placing the gabled containers in a box with the gables pointing upward. The box acts to support the containers and maintains the containers as a rigid structure. If one desires to stack another layer of gabled containers on top of the first layer, a piece of cardboard is placed on top of the gable containers in the box to support the next layer. The size of the box and the ability of the gables to support an additional layer of containers limit the stacking process.

SUMMARY OF THE INVENTION

It is the objective of this invention to eliminate the use of boxes to transport gable containers. It is the objective of this invention to be able to bundle gable containers and not be constrained by the gables in determining the size of the bundles. This is accomplished by nesting the gable containers on a conveyor on their side. The nesting of the gable containers on their side provides a stable structure that can be moved on a conveyor to be film wrapped. After film wrapping, the containers are conveyed to a heat shrink tunnel to form bundles of gable containers that can be place on a pallet.

DETAILED DESCRIPTION OF THE INVENTION

Figure 1:
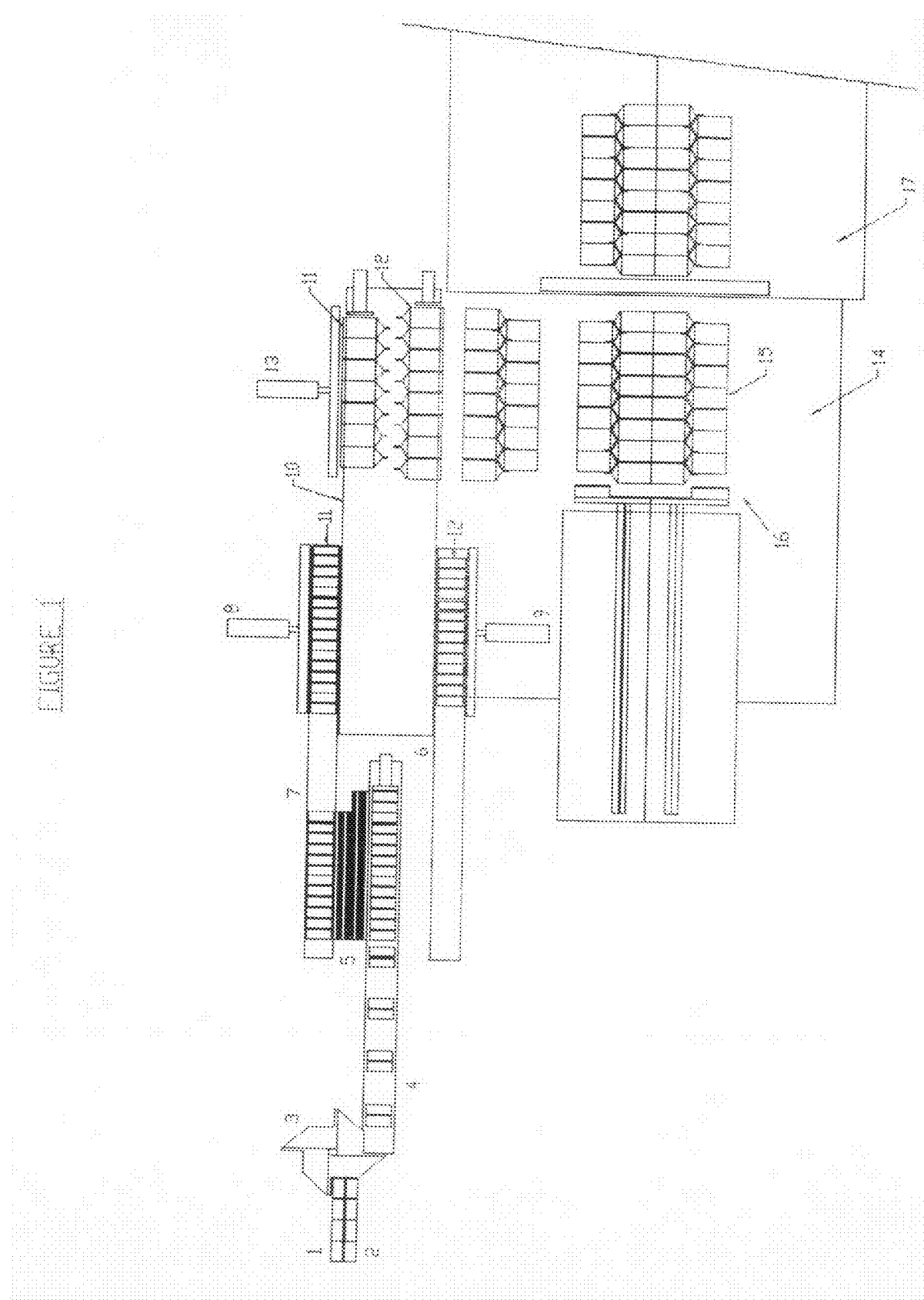
FIG. 1 shows forming nested groups of gable containers conveyed to a film wrapping apparatus to be heat shrunk.
Figure 2:
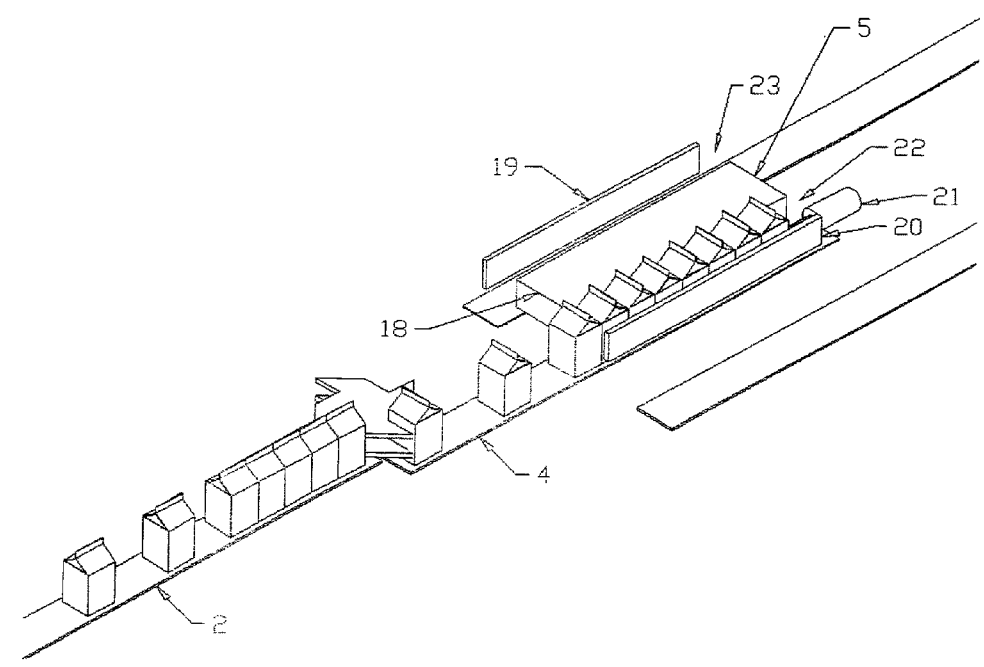
FIGS. 2-5 show shuttling groups of gabled containers on a conveyor to another conveyor
Figure 3:
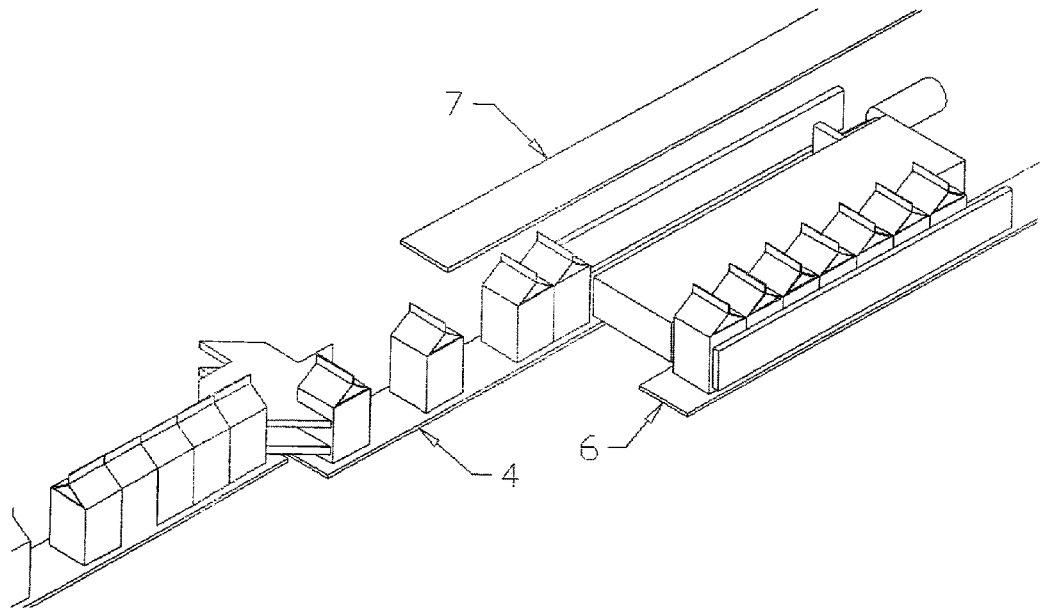
Figure 4:
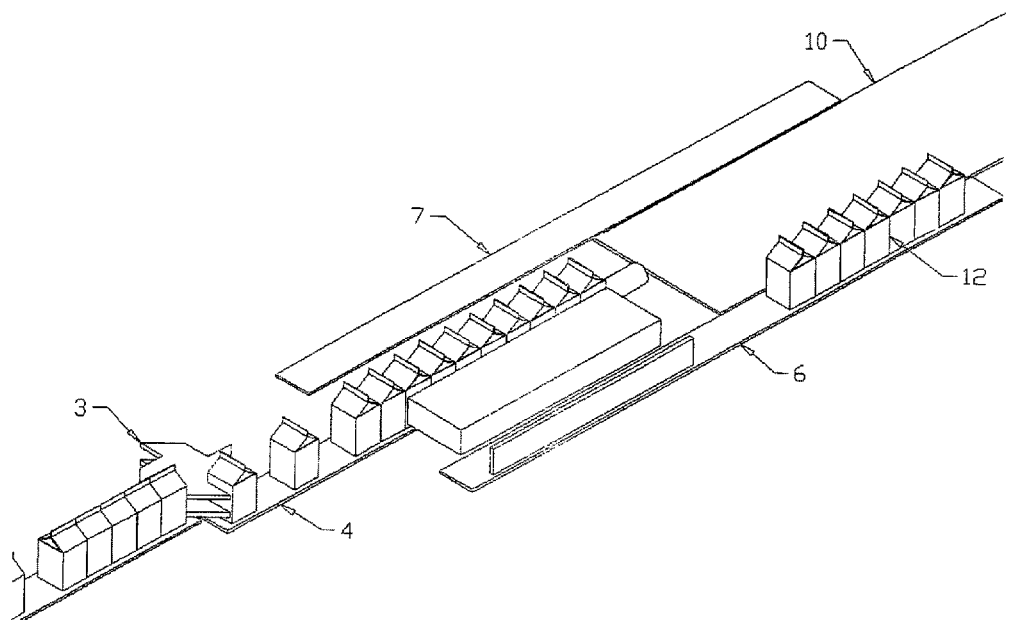
Figure 5:
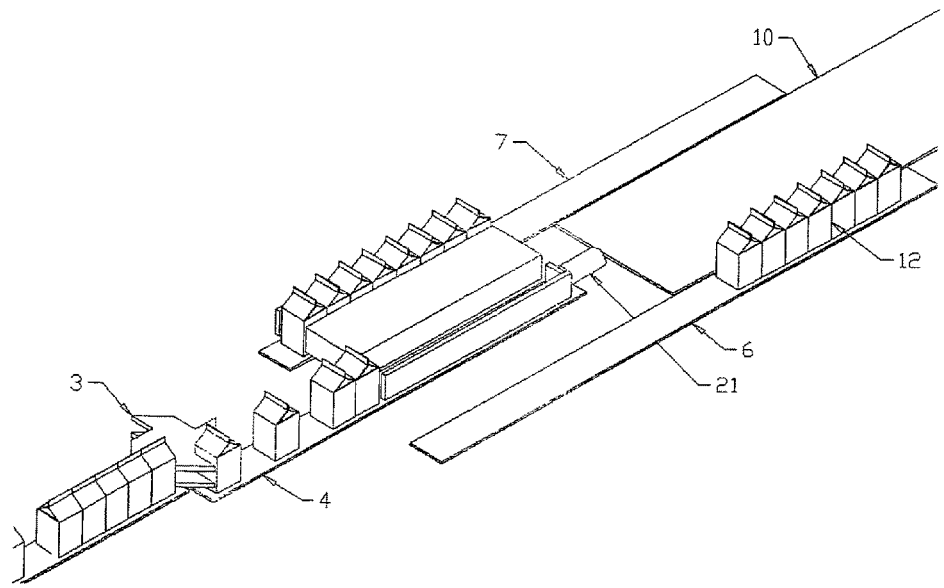

FIG. 1 shows gable containers 1 on a conveyor 2 being turned 90 degrees by star wheel 3 so that the ridge line of the gable is perpendicular to the movement of the conveyor. The turned gable containers are transferred to conveyor 4 where they are moved by shuttle conveyor 5 in groups with a predetermined number of containers to conveyors 6 and 7. The shuttle conveyor 5 is usually mounted on a carriage above the conveyor 4 to divert the predetermined groups of containers as they travel on conveyor 4. The predetermined groups of containers 11 and 12 are moved to a position where the pushers 8 and 9 can tip the containers on their sides onto conveyor 10 so that the gables of containers 11 and 12 face each other and can be pushed in to a nested structure. The tipping of the containers can be accomplished by pushing the containers over an elevated step. The pushers 8 and 9 can have guides on the sides of the pusher to help maintain the containers in groups 11 and 12 in the desired position. Guides can be located on the end of conveyor 10 to stop the travel of the group of containers 11 and 12 so that the containers align themselves in the desired orientation for nesting. Pusher 13 pushes the containers in group 11 so that the gables of the containers in group 11 nest with the gables of the containers in group 12. Once the nest is formed, the pusher pushes the nested groups of container onto a plate 14. The process can be repeated to build up multiple nested groups of containers. Two groups of nested containers 15 are pushed in front of pusher 16 that pushed the nested groups 15 onto a conveyor 17 to be taken to a film wrapping station. Guides can be positioned in places to ensure that the containers stay in a nested arrangement.

The nested arrangement can be used with conventional film wrapping apparatus such as a lap seal machine described in U.S. Pat. No. 7,328,554; filed on Oct. 18, 2006, inventor Alain Cerf or an automated film wrapping apparatus described in U.S. Pat. No. 5,934,049 filed on Jan. 27, 1998, inventor Alain Cerf. Both patents are incorporated by reference in their entirety.

Figure 6:
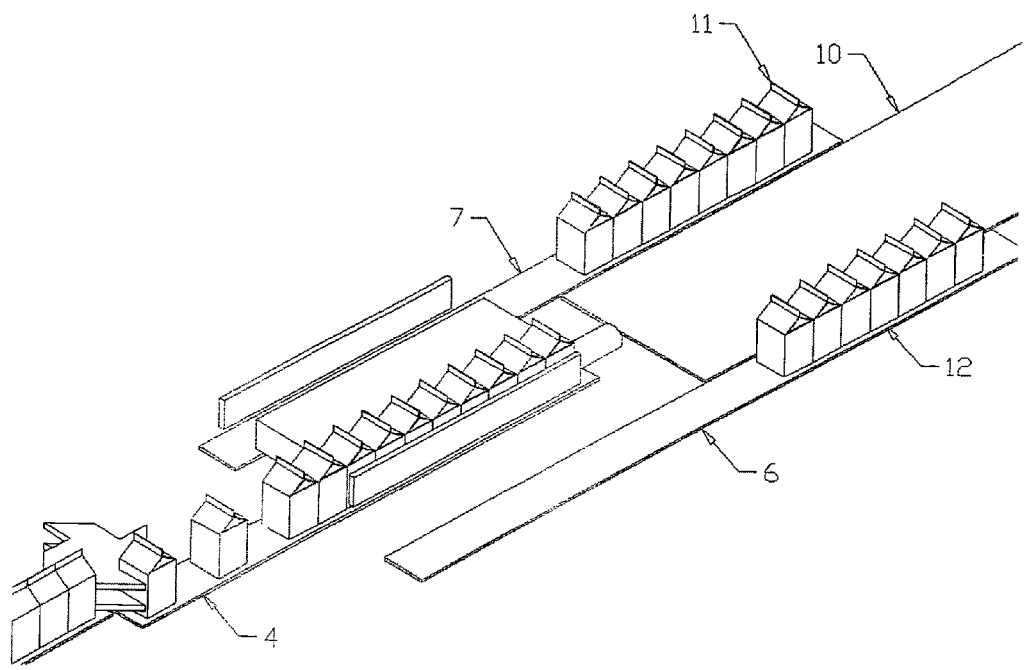
FIGS. 6-7 shows transferring groups of containers from a conveyor to another conveyor and turning the groups of containers on their side.
Figure 7:
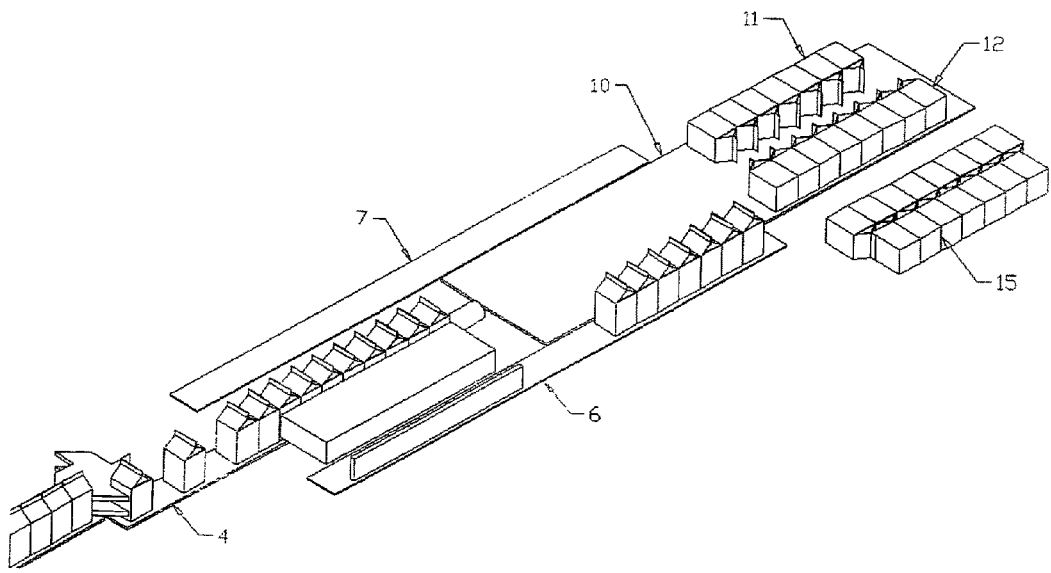

FIGS. 2-6 shows containers 1 moving on conveyer 2 being transferred by the star wheel 3 on to conveyor 4 and onto shuttle conveyor 5. Shuttle conveyor has open lanes 22 and 23 formed by spacer 18 and side plates 19 and 20. The open lanes can be moved back and forward so they can be aligned with the containers on conveyor 4. A cylinder 21 with a stop is used to limit the number of containers that enter the open lane. After a predetermined number of containers enter lane 22, the shuttle moves the containers onto conveyor 6 and aligns open lane 23 with the containers on conveyor 4. After a predetermined number of containers fill up lane 23 the shuttle moves these containers to conveyor 7. The shuttle conveyor is a preferred embodiment. Other transfer devices such as pick and place machines or diverters can be used to move a predetermined number of containers back and forth to conveyors 7 and 6. FIGS. 6-7 shows group of containers 11 and 12 lying on their sides on conveyor 10 and nested group of containers 15 waiting to be joined with another group of nested containers to form a nested arrangement that be film wrapped and heat shrunk to form bundles of containers in a stable structural arrangement.

The invention claimed is:

1. A process for transporting gable containers on a conveyor for film wrapping comprising
    providing the gable containers on a first conveyor so that the ridge line of the gable containers are perpendicular to the directional movement of the conveyor,
    forming groups having a predetermined number of containers that are to be nested together,
    transporting and placing a first group of containers from the first conveyor on a second conveyor and a second group of containers from the first conveyor on a third conveyor,
    positioning and placing each group of containers from the second and third conveyor on their side to rest on a fourth conveyor so that the gables of each group face each other and can be nested,
    nesting the groups of containers on the fourth conveyor,
    film wrapping the nested groups of containers, and
    heat shrinking the film wrapped nested groups of containers.

2. A process according to claim 1 including the steps of turning the containers so that the ridge line of the gable containers are perpendicular to the directional movement of the conveyor.

3. A process according to claim 1 including the steps of providing a shuttle conveyor having two open spaced apart lanes, and sequentially filling each lane with a predetermined number of containers to form a group from the first conveyor and transporting the group in the first filled lane to a second conveyor and transporting the second filled lane to a third conveyor.

4. A process according to claim 1 including the steps of tipping the groups of containers on the second and third conveyors over on their side to rest on a fourth conveyor by a pusher so that the gables of each group face each other and can be nested by pushing them together.

5. A process according to claim 4 wherein the nesting is accomplished by pushing a group of containers on their sides toward another group of containers on their sides to form a first nested structure.

6. A process according to claim 5 including pushing the first nested structure on to a waiting station.

7. A process according to claim 6 including the step of pushing a second nested structure onto the waiting station that abuts the first nested structure to form an arrangement of two nested structures.

8. A process according to claim 5 including the steps of pushing the first nested structure in front of a pusher that can push the first nested structure on to conveyor for film wrapping the nested structure.

9. An apparatus for film wrapping nested gable containers comprising
- means for providing gable containers on a first conveyor so that the ridge line of the gable containers are perpendicular to the directional movement of the conveyor,
- means for forming groups of a predetermined number of containers that are to be nested together including means for transporting a first group of containers on a second conveyor and a second group of containers on a third conveyor
- means for positioning and placing the container in each group from the second and third conveyor on their side to rest on a fourth conveyor so that the gables of each group face each other and can be nested together,
- means for nesting the groups of containers resting on their side on the fourth conveyor
- means for film wrapping the nested group of containers
- means for heat shrinking the film.

10. An apparatus according to claim 1, wherein the means for providing the gabled containers includes means for turning gable containers so that the ridge line of the gable is perpendicular to the movement of the conveyor includes means for turning the containers.

11. An apparatus according to claim 1, wherein the means for forming groups of the containers is a shuttle conveyor having two open lanes wherein each lane can be sequentially filled with a group having a predetermined number of containers from the first conveyor and can transport the first filled lane to the second conveyor and the second filled lane to a third conveyor.

12. An apparatus according to claim 1, wherein the means for positioning and placing the container in each group on their side include means for tipping the groups of containers on the second and third conveyors over on their side on their sides to rest on a fourth conveyor by a pusher so that the gables of each group face each other and can be nested by pushing them together.

13. An apparatus according to claim 12, wherein the means for positioning and placing the container in each group on their side include guide means for maintaining the containers in their proper position.

14. An apparatus according to claim 12, wherein the means for tipping includes an elevated step that causes the containers to tip over when they are pushed onto the fourth conveyor.

15. An apparatus according to claim 12 wherein the means for nesting includes means for pushing a first group of t containers resting on their side on the fourth conveyor toward a second group of containers until the first and second group form a first nested structure.

16. An apparatus according to claim 15, wherein the means for pushing a group of the containers on their sides includes means to push a second nested structure to join and abut the first nested structure to form a stable nested arrangement.

17. An apparatus according to claim 1, including means for the conveying the nested containers by pushing the nested containers to a means for film wrapping the nested containers.

18. An apparatus according to claim 16, wherein the means for pushing a group of the containers on their sides includes means to push the nested containers to a station having means to convey the stable nested arrangement to a means for film wrapping.

* * * * *